US008438729B2

(12) United States Patent
Ibe et al.

(10) Patent No.: US 8,438,729 B2
(45) Date of Patent: May 14, 2013

(54) METHOD OF PRODUCING LIQUID DISCHARGE HEAD

(75) Inventors: Satoshi Ibe, Yokohama (JP); Shuji Koyama, Kawasaki (JP); Yoshiaki Suzuki, Kawasaki (JP); Hiroto Komiyama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1330 days.

(21) Appl. No.: 11/674,710

(22) Filed: Feb. 14, 2007

(65) Prior Publication Data

US 2007/0211115 A1 Sep. 13, 2007

(30) Foreign Application Priority Data

Mar. 9, 2006 (JP) ................................ 2006-064167

(51) Int. Cl.
*B21D 53/76* (2006.01)
*B23P 17/00* (2006.01)

(52) U.S. Cl.
USPC ........................................................ 29/890.1

(58) Field of Classification Search ................. 29/890.1; 347/20, 40, 65
See application file for complete search history.

(56) References Cited

U.S. PATENT DOCUMENTS

| | | | | |
|---|---|---|---|---|
| 5,081,474 | A * | 1/1992 | Shibata et al. | 347/59 |
| 5,358,904 | A * | 10/1994 | Murakami et al. | 29/827 |
| 5,385,904 | A * | 1/1995 | Andersson et al. | 514/252.12 |
| 5,491,505 | A * | 2/1996 | Suzuki et al. | 347/203 |
| 6,302,504 | B1 * | 10/2001 | Imanaka et al. | 347/9 |
| 6,305,080 | B1 * | 10/2001 | Komuro et al. | 29/890.1 |
| 6,315,853 | B1 * | 11/2001 | Kubota et al. | 156/257 |
| 6,361,150 | B1 * | 3/2002 | Schulte et al. | 347/56 |
| 6,382,756 | B1 * | 5/2002 | Komuro | 347/14 |
| 6,458,255 | B2 * | 10/2002 | Chiang et al. | 204/192.15 |
| 6,488,823 | B1 * | 12/2002 | Chiang et al. | 204/192.15 |
| 6,540,334 | B1 * | 4/2003 | Mrvos et al. | 347/64 |
| 6,609,782 | B2 * | 8/2003 | Mori | 347/50 |
| 6,609,783 | B1 * | 8/2003 | Koyama et al. | 347/58 |
| 6,629,755 | B2 * | 10/2003 | Saito et al. | 347/58 |
| 6,663,235 | B2 * | 12/2003 | Erickson et al. | 347/87 |
| 6,704,996 | B2 * | 3/2004 | Mrvos et al. | 29/611 |
| 6,811,715 | B2 * | 11/2004 | Suzuki | 216/27 |
| 6,911,124 | B2 * | 6/2005 | Tang et al. | 204/192.15 |
| 6,959,980 | B2 * | 11/2005 | Heberling et al. | 347/50 |
| 6,986,980 | B2 * | 1/2006 | Kubota et al. | 430/156 |
| 7,028,402 | B2 * | 4/2006 | Miyamoto et al. | 29/890.1 |
| 7,115,975 | B2 * | 10/2006 | Mori | 257/668 |

(Continued)

FOREIGN PATENT DOCUMENTS

JP 2005-199701 7/2005

*Primary Examiner* — David Angwin
(74) *Attorney, Agent, or Firm* — Fitzpatrick, Cella, Harper & Scinto

(57) ABSTRACT

A method can produce a liquid discharge head including a liquid discharge energy generating element, a liquid discharge port, a liquid flow path, an electric circuit for driving the liquid discharge energy generating element, a first electrode pad for exchanging electrical signals with the exterior and a second electrode pad for testing the electric circuit. The method includes preparing a substrate provided with a conductive layer for forming the first electrode pad and the second electrode pad, forming a protective layer directly on the second electrode pad, after forming the protective layer, forming a metal layer by an electro less plating method on the conductive layer, removing the protective layer after the metal layer is formed, and providing a layer comprised of a resin on the second electrode pad after the protective layer is removed.

10 Claims, 5 Drawing Sheets

U.S. PATENT DOCUMENTS 7,159,969 B2 * 1/2007 Conta et al. .................... 347/65
7,253,109 B2 * 8/2007 Ding et al. .................... 438/685
7,261,393 B2 * 8/2007 Miyamoto et al. .............. 347/56
7,452,474 B2 * 11/2008 Komuro et al. ................. 216/27
7,591,071 B2 * 9/2009 Ibe et al. ...................... 29/890.1
7,641,316 B2 * 1/2010 Sakai et al. ..................... 347/64
7,681,993 B2 * 3/2010 Ono et al. ....................... 347/63
7,687,909 B2 * 3/2010 Ding et al. .................... 257/751
7,712,875 B2 * 5/2010 Shibata et al. .................. 347/56
7,780,270 B2 * 8/2010 Lee et al. ........................ 347/62
8,075,107 B2 * 12/2011 Hatsui et al. .................... 347/71
8,142,678 B2 * 3/2012 Matsuda et al. ....... 252/62.9 PZ
8,227,043 B2 * 7/2012 Kubota et al. .............. 427/407.1
2005/0128254 A1 * 6/2005 Ibe et al. ......................... 347/58
2006/0170734 A1 * 8/2006 Ibe et al. ......................... 347/58
2006/0250151 A1 * 11/2006 Cram et al. ................... 324/754
2008/0094454 A1 * 4/2008 Koyama et al. ................. 347/61

* cited by examiner

METHOD OF PRODUCING LIQUID DISCHARGE HEAD

BACKGROUND OF THE INVENTION

1. Field of the Invention

The present invention relates to a liquid discharge head for discharging a liquid and a producing method therefor, and more particularly to an electrode pad of a substrate for the liquid discharge head.

2. Description of the Related Art

There is already known a method for producing an ink jet recording head, utilizing a semiconductor manufacturing process and enabling electrical connection of an element substrate without dust deposition, for example in a clean room (Japanese Patent Application Laid-open No. 2005-199701). In this producing method, an electrode pad of the element substrate is formed by an electrolytic plating.

In such producing method, an element substrate is prepared at first, then a gold bump for an electrode pad is formed by an electrolytic plating, and a flow path wall forming member is provided thereafter. In the step of forming the element substrate, a heater, an electrode pad for external connection, and an electrode pad for testing are formed on the substrate. As the gold bump forming step involves a chemical treatment, the flow path wall forming member is to be provided after the gold bump is formed.

The gold bump formation for the electrode pad by electrolytic plating is executed by the following steps in succession, which are an undercoat layer forming step with a high-melting point metal material such as TiW, an Au (undercoat seed gold) film forming step, a resist coating/exposure/developing step, a gold deposition step by an electrolytic plating, a resist stripping step, an etching step for the undercoat seed gold, and an etching step for the undercoat layer of high-melting point metal material.

In the manufacture of an ink jet recording head, in addition to an external connection electrode pad for exchanging electrical signals with the exterior, a test electrode pad to be used as an electrode for testing a circuit formed on the head substrate may also be formed on the substrate. In the above-described manufacturing process, however, in the case that the test electrode pad is not gold plated, the exposed test electrode pad (made of aluminum or an aluminum alloy) may be corroded at the etching of the undercoat seed gold, or of the undercoat layer of high-melting point metal material.

The test electrode pad is therefore plated with gold in order to avoid such erosion.

In the following, a process of gold plating on the test electrode pad will be described with reference to FIGS. 11A and 11B. FIGS. 11A and 11B are schematic views showing intermediate steps in the manufacture of a prior ink jet recording head, wherein FIG. 11A is a perspective view and FIG. 11B is a partial cross-sectional view of a portion 11B-11B.

On an aluminum wiring 10*b* of the test electrode pad 8, a gold bump 18*b* is formed, and an adhesive layer 2 utilizing a resinous material is laminated thereon. Then, a flow path wall forming member 3, having an ink flow path therein, is provided so as to cover the upper part thereof with photosensitive resin. The test electrode pad 8, though no longer necessary after the formation of the flow path wall forming member 3, has a structure connectable to the circuit and is in an electrically conductive state during the use of the ink jet recording head. Therefore, the test electrode pad 8 is insulated by the adhesive layer 2. Also on the aluminum wiring 10*a* of the external connection electrode pad 7, a gold bump 18*a* is formed, which is connected to an external electrode member 15 and is then sealed by a sealant 16.

In such structure, however, the flow path wall forming member 3 may be partly peeled by a thermal contraction at the manufacture or the insulation by the adhesive layer 2 on the test electrode pad 8 may become insufficient, so that the aluminum wiring 10*b* may come into contact with the ink and may be corroded. Such corrosion of the aluminum wiring 10*b* further induces a corrosion spreading to a wiring portion which is satisfactorily insulated.

SUMMARY OF THE INVENTION

An object of the present invention is to provide a liquid discharge head which is improved in an insulating property of a test electrode pad to liquid and is thus capable of suppressing a corrosion in an aluminum wiring connected to the test electrode pad and improving the reliability, and a producing method therefor.

Another object of the present invention is to provide a method for producing a liquid discharge head including a liquid discharge energy generating element for generating a liquid discharge energy, a liquid discharge port, a liquid flow path, an electric circuit for driving the liquid discharge energy generating element, a first electrode pad for exchanging electrical signals with the exterior and a second electrode pad for testing the electric circuit, the method including: preparing a substrate provided with a first wiring layer for forming the first electrode pad and a second wiring layer for forming the second electrode pad, forming an insulating film on the substrate so as to expose the first wiring layer and to cover the second wiring layer, forming a metal film by an electroless plating method on the surface of the first wiring layer, and stripping the insulating film.

Still another object of the present invention is to provide a liquid discharge head, which has a liquid discharge energy generating element for generating a liquid discharge energy, a liquid discharge port for discharging a liquid, a liquid flow path communicating with the liquid discharge port, and an electric circuit for driving the liquid discharge energy generating element, and in which the liquid is discharged from the liquid discharge port by the liquid discharge energy, the liquid discharge head including a first electrode pad which is formed by providing an electroless nickel-phosphorus layer, an electroless substituted gold layer and an electroless reduced gold layer in this order on the first wiring layer and which serves for exchanging electrical signals with the exterior, a second electrode pad formed by the second wiring layer and serving for testing the electric circuit, and a flow path wall forming member formed on the second wiring layer across an adhesive layer and serving to form the liquid flow path.

Further features of the present invention will become apparent from the following description of exemplary embodiments with reference to the attached drawings.

BRIEF DESCRIPTION OF THE DRAWINGS

FIG. 11A is a perspective view and FIG. 11B is a cross-sectional view along the line 11B-11B in FIG. 11A.

DESCRIPTION OF THE EXEMPLARY EMBODIMENTS

In the following, an exemplary embodiment of the present invention will be described, taking an ink jet recording head as an example of the liquid discharge head, with reference to the accompanying drawings.

Figure 1A:
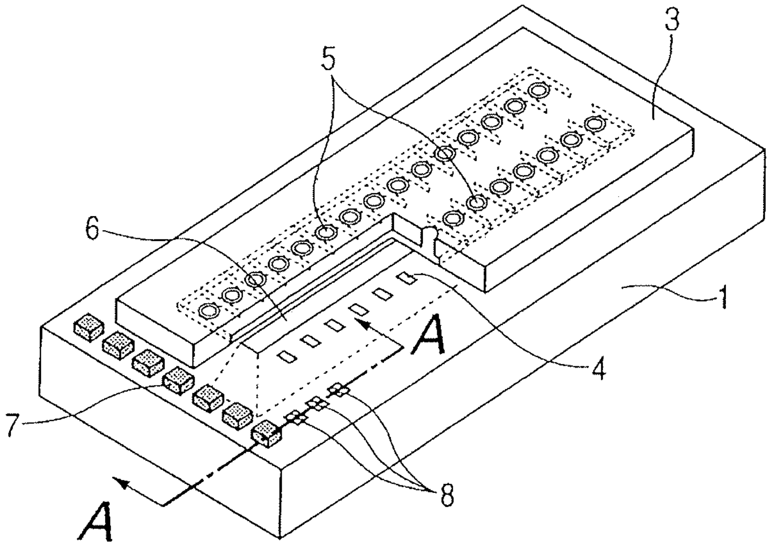
FIGS. 1A and 1B are schematic views illustrating an exemplary embodiment of the ink jet recording head obtained by the present invention, and are respectively a perspective view and a partial cross-sectional view corresponding to a portion A-A.
Figure 1B:
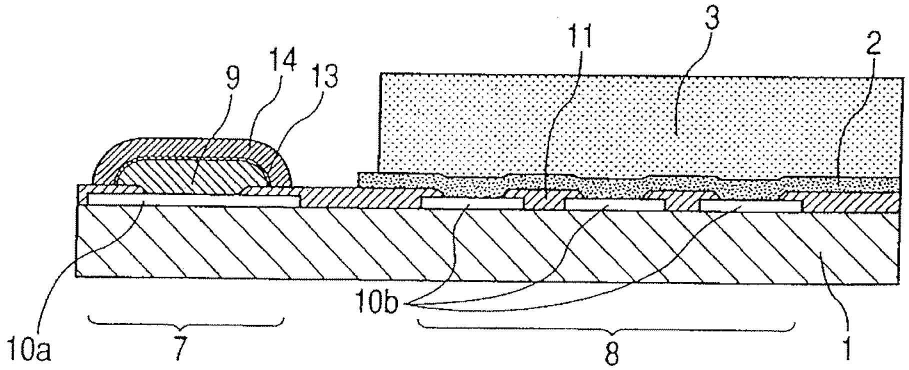

FIG. 1A is a schematic perspective view illustrating an ink jet recording head, produced in the present invention, and FIG. 1B is a cross-sectional view along A-A therein.

The ink jet recording head (liquid discharge head) includes, on a silicon substrate 1 as a substrate, heat generating elements 4 as ink discharge energy generating elements (liquid discharge energy generating elements) in which such elements are arranged with a predetermined pitch in a linear array and such linear array is formed in two rows. On the silicon substrate, a flow path wall forming member 3 formed with a photosensitive resin and an adhesive layer 2 of a polyetheramide resin for adhering a lower surface thereof are formed with a same shape. On the substrate, a passivation film 11 is formed in advance.

Lateral walls of the flow path and an upper wall of the flow path have a same photosensitive resin. In an upper part of the flow path, an ink discharge port (liquid discharge port) 5 is provided above each heat generating element 4. An ink supply aperture (liquid supply aperture) 6 is formed by an anisotropic etching, utilizing a $SiO_2$ film as a mask, from a rear side of the silicon substrate (a side thereof on which the ink discharge energy generating elements are provided being defined as a top side). The ink supply aperture (liquid supply aperture) 6 is opened between two arrays of the heat generating elements 4.

In such ink jet recording head, a pressure generated by the heat generating element 4 is applied to the ink (liquid), filled into the ink flow path through the ink supply aperture 6. Thus the ink discharge port 5 discharges an ink droplet to deposit the ink onto a recording medium, thereby forming a record. The ink discharge port is provided in plural units, and the heat generating element is provided corresponding to each ink discharge port. Also an ink discharge port may be provided corresponding to plural heat generating elements.

FIG. 1B is a partial cross-sectional view of an external connection electrode pad 7 as a first electrode for exchange of electrical signals between the silicon substrate 1 and an exterior of the recording head, and a test electrode pad 8 as a second electrode for testing an electric circuit for driving the heat generating element. The external connection electrode pad 7 includes a metal film on an aluminum wiring 10*a* as a first wiring layer. The metal film has a structure including, from above to below, an electroless reduced gold film 14, an electroless substituted gold film 13 and an electroless nickel-phosphorus layer 9. The test electrode pad 8 has an aluminum wiring 10*b* as a second wiring layer, which is covered by a polyetheramide resin constituting the adhesive layer 2 and a photosensitive resin constituting the flow path wall forming member 3.

In the following, a producing method for the ink jet recording head, as an exemplary embodiment of the liquid discharge head, utilizing an electroless plating will be described with reference to FIGS. 2 to 10.

Figure 2:
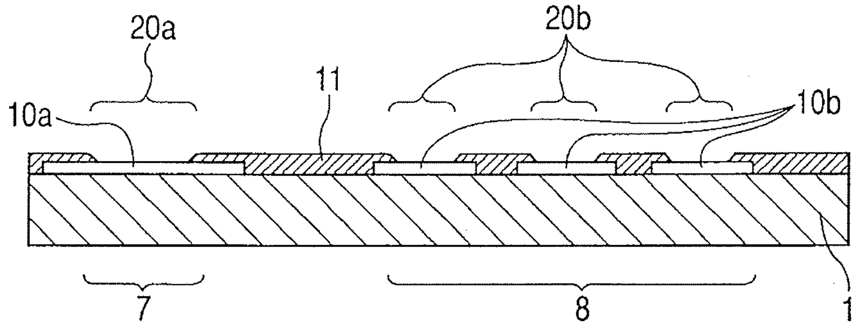
FIG. 2 is a schematic view illustrating an exemplary embodiment of the present invention.

FIG. 2 is a schematic cross-sectional view along A-A in FIG. 1A, illustrating the external connection electrode pad 7 and the test electrode pad 8, provided on the silicon substrate 1.

A silicon substrate 1, having aluminum wirings 10*a*, 10*b* for constituting electric circuits for driving plural heat generating elements 4 for generating ink discharge energy, is prepared. The aluminum wiring 10*a* is a first wiring layer formed in the position of the external connection electrode pad 7, and the aluminum wiring 10*b* is a second wiring layer formed in the position of the test electrode pad 8. Either aluminum wiring may be formed with aluminum or an aluminum alloy.

On a surface of the silicon substrate 1 bearing the aluminum wirings, a P—SiN film is formed as a passivation film 11. Through-holes 20*a*, 20*b* for exposing the aluminum wirings are formed in positions of the passivation film 11, respectively corresponding to the external connection electrode pad 7 and the test electrode pad 8.

Figure 3A:
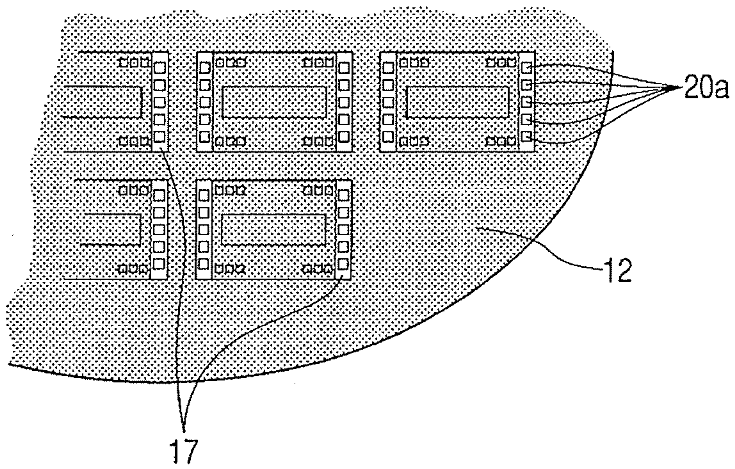
FIGS. 3A and 3B are schematic views illustrating an exemplary embodiment of the present invention, and are respectively a plan view and a cross-sectional view corresponding to a portion A-A in FIG. 1A.

Then, as shown in FIG. 3A, on an upper part of the silicon substrate 1, a resist film 12, which is an organic film containing cyclized rubber resistant to an electroless plating liquid as a principal component, is formed by a screen printing as a protective layer for protecting the aluminum wiring layer 10*b* from the plating liquid. FIG. 3A is a schematic plan view of the silicon substrate 1 seen from the top side. A through-hole 17 is formed in the resist film 12, with a dimension larger than that of the through-hole 20*a* in the passivation film 11 for the external connection electrode pad 7. In this manner, the resist film 12 is so formed as to expose the aluminum wiring 10*a* but to cover the aluminum wiring 10*b* (test electrode pad 8).

The screen printing enables an easy patterning of the resist film 12 as a protective layer having hole through-hole 17. The screen printing can be executed utilizing an ordinary technology, such as formation of a wiring on a printed circuit board or printing of a sealant on a glass substrate for liquid crystal display. Also, in place for the screen printing, a photolithographic patterning utilizing a photosensitive resist, containing a photosensitive cyclized rubber as a principal component, may be utilized.

Figure 3B:
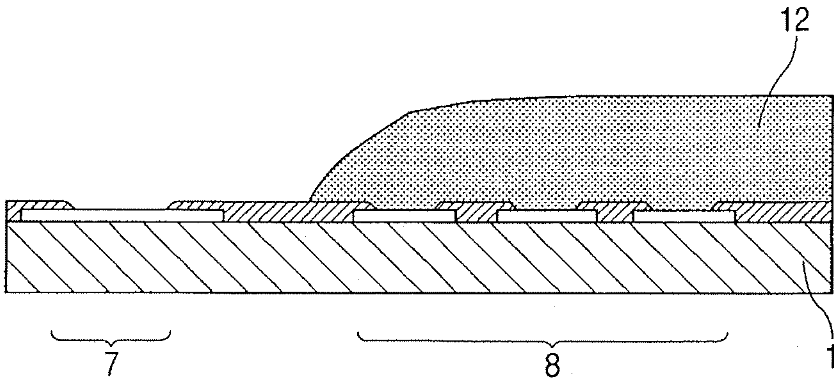

FIG. 3B is a cross-sectional view illustrating a state where the resist film 12, containing the cyclized rubber as the principal component, is patterned. Above the array of the test electrode pads 8, the resist film 12 is formed by coating the resist containing the cyclized rubber as the principal component.

Then, on the exposed portion of the aluminum wiring 10*a* of the external connection electrode pad 7, a metal film is formed by an electroless plating method.

Figure 4:
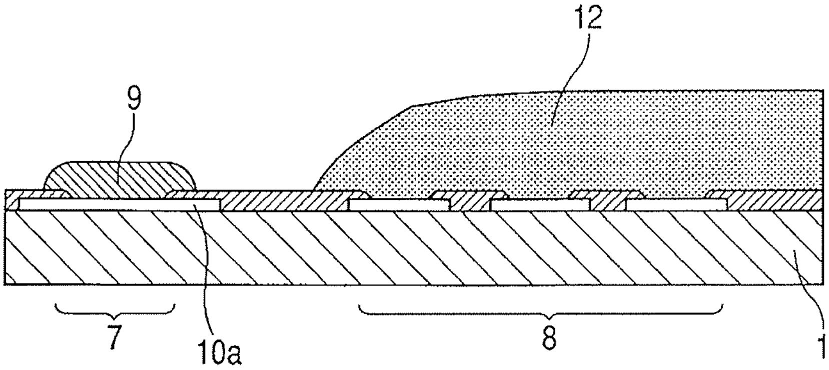
FIG. 4 is a schematic view illustrating an exemplary embodiment of the present invention.

The metal film is formed in the following manner. At first, as shown in FIG. 4, aluminum in the surface layer of the external connection electrode pad 7 is subjected to zinc substitution with zinc in the plating liquid, and then an electroless nickel-phosphorus layer 9, which is deposited by a substitution reaction and a reducing reaction, is formed on the surface layer.

Figure 5:
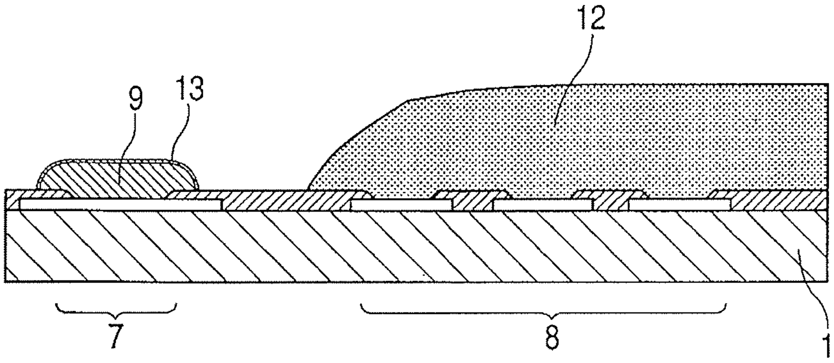
FIG. 5 is a schematic view illustrating an exemplary embodiment of the present invention.

Then, as shown in FIG. 5, the substrate bearing the electroless nickel-phosphorus layer 9 is immersed in a substituting gold sulfite bath, causing substituting reaction with nickel, to form an electroless substituted gold layer (seed substituted gold layer) 13 on the surface of the electroless nickel-phosphorus layer 9.

In this operation, the aluminum or aluminum alloy 10*b* of the test electrode pad 8, being covered by the resist film 12 containing the cyclized rubber as the principal component and serving as a protective layer, is prevented from corrosion by sulfurous acid. Stated differently, the conductive portions which may cause an electroless plating reaction are covered, excluding the portion where the metal film is to be formed by the electroless plating, by the resist film 12 whereby such portions are protected from being corroded at the plating operation.

Figure 6:
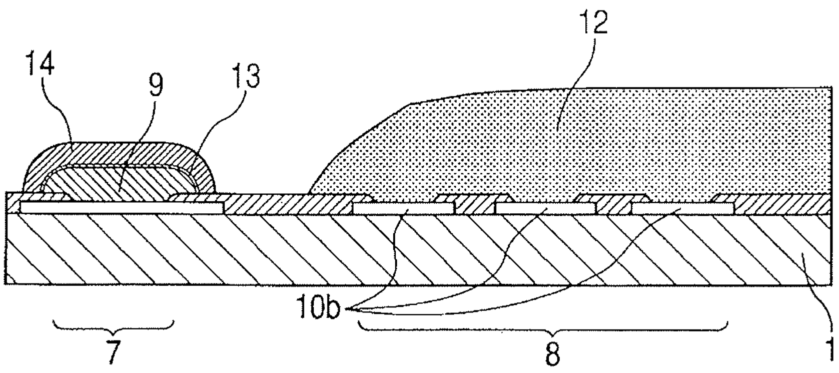
FIG. 6 is a schematic view illustrating an exemplary embodiment of the present invention.

Then, as shown in FIG. 6, the silicon substrate 1 is immersed in a reducing gold sulfite bath which causes a selective reducing reaction on the surface of the electroless substituted gold layer 13, to form an electroless reduced gold layer (thick reduced gold layer) 14 on the electroless substituted gold layer 13.

In this operation, as in the formation of the electroless substituted gold layer 13, the aluminum or aluminum alloy 10*b* of the test electrode pad 8, being covered by the resist film 12 containing the cyclized rubber as the principal component and serving as a protective layer, is prevented from corrosion by the reducing gold sulfite bath.

In this manner, the electroless reduced gold layer 14, the electroless substituted gold layer 13 and the electroless nickel-phosphorus layer 9 are formed from above to below only on the external connection electrode pad 7. Thus a metal film is formed on the aluminum wiring 10*a*, thus completing the gold bump 18*a*.

Figure 7:
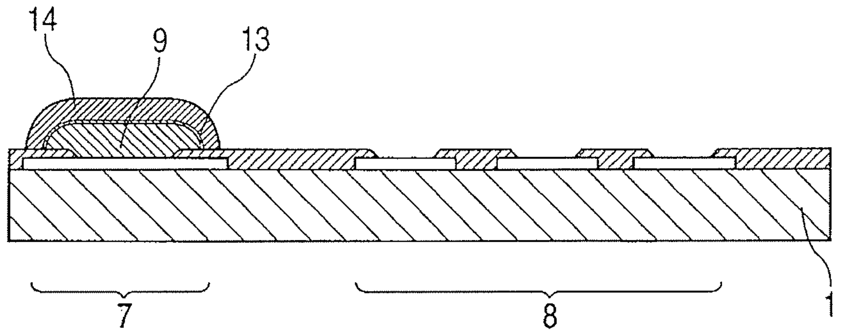
FIG. 7 is a schematic view illustrating an exemplary embodiment of the present invention.

Then, as shown in FIG. 7, the resist film 12, containing the cyclized rubber as the principal component and protecting the areas other than the external connection electrode pad 7, is removed by a stripper solution containing xylene as a principal component.

Thus, the silicon substrate 1 will have a cross-sectional structure, in which so-called electroless nickel-phosphorus/gold-plated bumps are formed on the external connection electrode pads 7 while the array of the test electrode pads 8 for testing the electric circuits do not have the bumps but maintains planarity. (FIG. 7)

Figure 8:
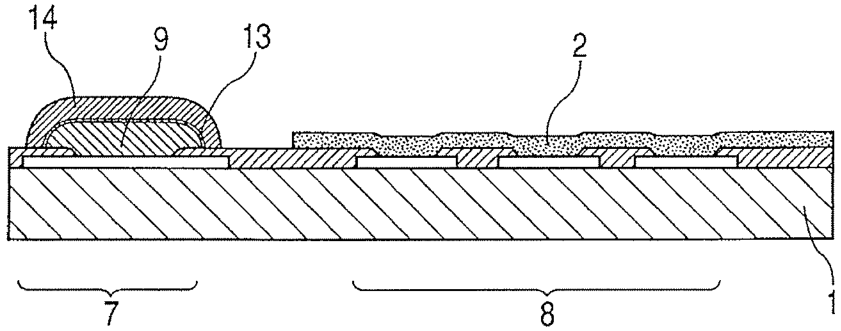
FIG. 8 is a schematic view illustrating an exemplary embodiment of the present invention.

Then, as shown in FIG. 8, a thermoplastic polyetheramide resin for forming the adhesive layer 2, which adheres the resin (covering photosensitive resin) constituting the flow path wall forming member 3 and the passivation film (P—SiN film) 11 of the semiconductor element substrate, is patterned by a photolithographic technology. In this operation, the aluminum wiring 10*b* is also simultaneously covered by this resin.

Thus, in the present exemplary embodiment, the second wiring layer (aluminum wiring 10*b*) is covered and protected by the resin in executing the electroless plating method.

Therefore, when the adhesive layer 2 for adhering the flow path wall forming member 3, including the ink flow path therein, is formed on the silicon substrate 1, the aluminum wiring 10*b* can be covered by the resin for forming the adhesive layer 2, without requiring another covering treatment. However, such process is not restrictive, and the effect of the present exemplary embodiment of improving the insulating property for the test electrode pad can be expected even in case of covering the aluminum wiring 10*b* with another resin.

The surface irregularity in the part of the test electrode pad 8 can be maintained at about the thickness of the passivation film 11 at maximum. Therefore, the surface irregularity can be easily made smaller. Therefore, polyetheramide resin follows such surface irregularity, and can maintain a satisfactory insulating property for the test electrode pad 8. In such state, the polyetheramide resin as the adhesive layer 2 can be patterned with a uniform film thickness.

Figure 9:
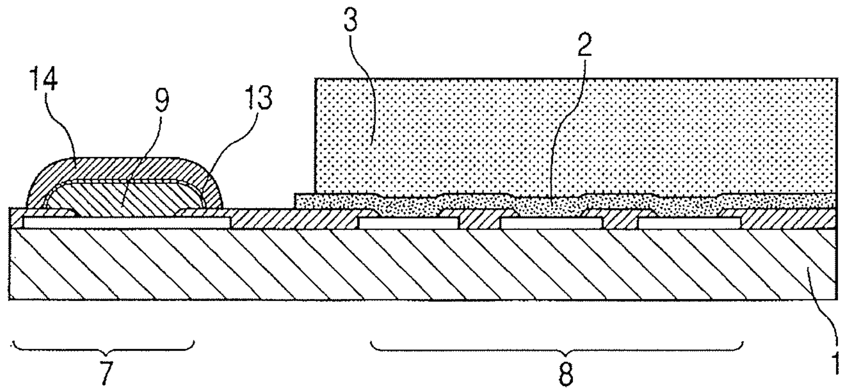
FIG. 9 is a schematic view illustrating an exemplary embodiment of the present invention.

Then, as shown in FIG. 9, as an upper layer for the polyetheramide resin constituting the adhesive layer 2, a photosensitive resin for forming the ink flow path pattern is patterned by a photolithographic technology, thereby forming the flow path wall forming member 3.

In this stage, the sealed area for the external connection electrode pad 7 for connection with an external electrode is clearly separated from the test electrode pad area which is covered by the polyetheramide resin as the adhesive layer 2 and by the covering photosensitive resin constituting the flow path wall forming member 3.

Figure 10:
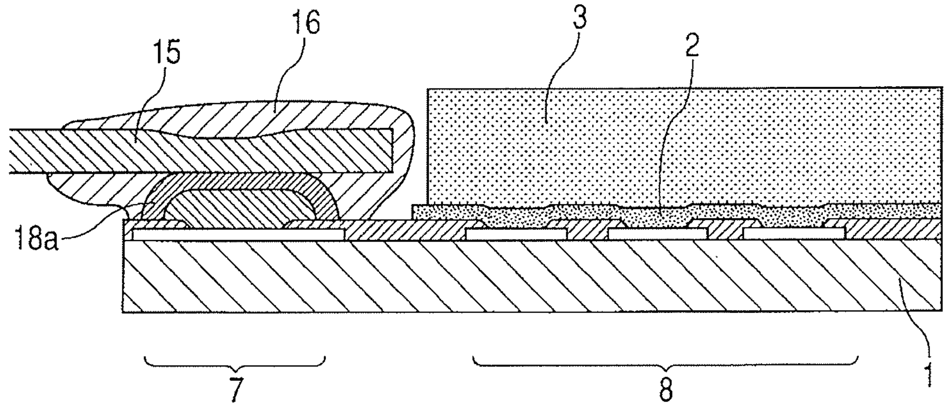
FIG. 10 is a schematic view illustrating an exemplary embodiment of the present invention.

Then, as shown in FIG. 10, the external connection electrode pad 7 and an external electrode member 15 are electrically connected, and the electrode pad portion is covered by a sealant 16.

The processes described above provides a construction in which the external connection electrode pads 7 are protected by the sealant while the flow path wall forming member 3, serving as a nozzle material (material to be used for forming the ink flow path), maintains planarity and serves as an insulating film for the array of the test electrode pads 8. In this manner, an ink jet recording head is completed.

Figure 11A:
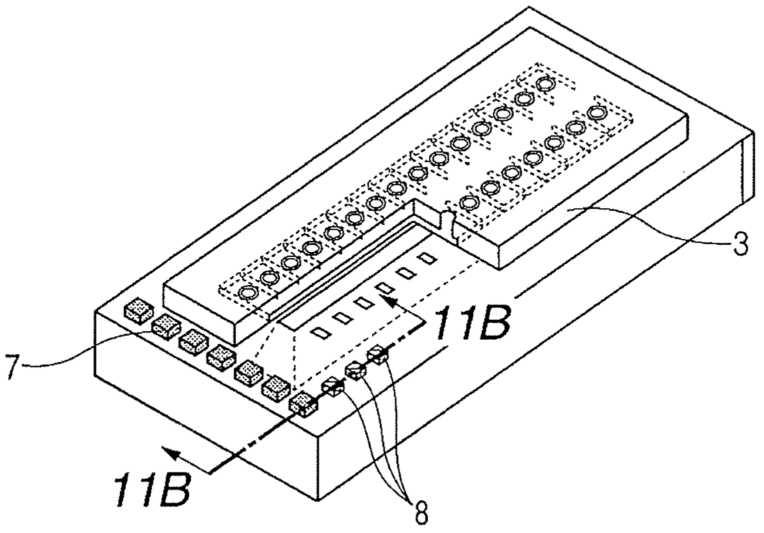
FIGS. 11A and 11B are schematic views illustrating a prior ink jet recording head.
Figure 11B:
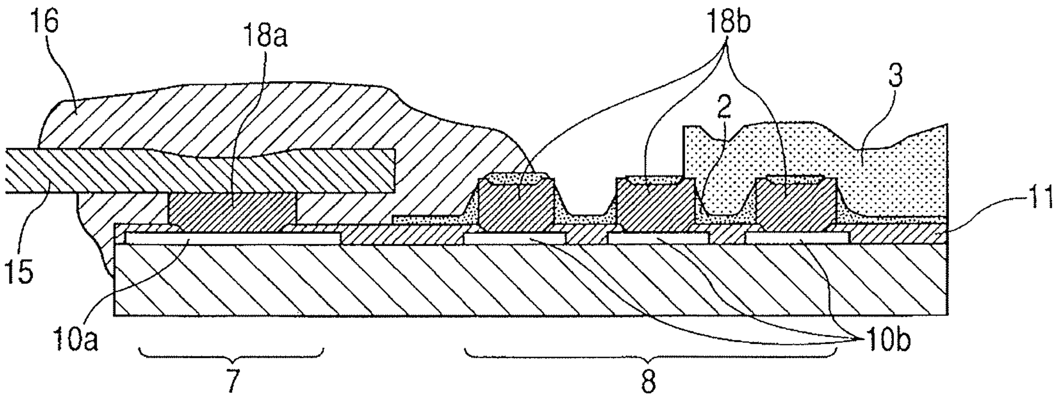

In the prior process, in the case that the polyetheramide resin as the adhesive layer 2 is coated after the formation of the bump 18*b* as shown in FIGS. 11A and 11B, a satisfactory covering with the adhesive layer 2 is difficult because of the presence of the bump 18*b*. In contrast, the present embodiment easily enables to satisfactorily cover the aluminum wiring 10*b* with the adhesive layer 2. Also an evident effect can be obtained in that, by covering a portion not requiring a plating by a resist film as a protective layer, such portion is not plated and that the aluminum wiring is not deteriorated even by a rinsing after the removal of the resist film.

Furthermore, the present exemplary embodiment, utilizing electroless plating instead of electrolytic plating, enables to reduce the investment in the facility, thereby allowing to produce an ink jet recording head of a lower cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-064167 filed on Mar. 9, 2006, which is incorporated hereinto by reference.

What is claimed is:

1. A method for producing a liquid discharge head which includes a liquid discharge energy generating element for generating liquid discharge energy, a liquid discharge port for discharging a liquid, a liquid flow path communicating with the liquid discharge port, an electric circuit for driving the liquid discharge energy generating element, a first electrode pad for exchanging electrical signals with an exterior connection and a second electrode pad for testing the electric circuit, the liquid being discharged from the liquid discharge port by the liquid discharge energy, the method comprising:

preparing a substrate provided with a conductive layer for forming the first electrode pad for exchanging electrical signals with the exterior connection and the second electrode pad for testing the electric circuit;

forming a protective layer directly on at least the second electrode pad;

after the protective layer is formed, forming a metal layer by an electroless plating method on the conductive layer, thereby completing the first electrode pad;

removing the protective layer after the metal layer is formed; and providing a layer comprised of a resin on the second electrode pad after the protective layer is removed.

2. A producing method for a liquid discharge head according to claim 1, further comprising providing a flow path wall forming member which constitutes walls of the liquid flow path.

3. A producing method for a liquid discharge head according to claim 1, wherein the resin is a thermoplastic polyetheramide resin.

4. A producing method for a liquid discharge head according to claim 1, wherein the conductive layer is formed of one of aluminum and an aluminum alloy.

5. A producing method for a liquid discharge head according to claim 1, wherein the metal layer comprises a gold bump.

6. A producing method for a liquid discharge head according to claim 5, wherein the gold bump is formed by providing an electroless nickel-phosphorus layer, an electro less substituted gold layer and an electroless reduced gold layer in this order on the conductive layer.

7. A producing method for a liquid discharge head according to claim 1, wherein the protective layer formation comprises forming the protective layer by a screen printing.

8. A producing method for a liquid discharge head according to claim 1, wherein the protective layer formation includes forming the protective layer on a conductive portion that may cause an electroless plating reaction, excluding a portion where the metal layer is to be formed by the electroless plating.

9. A producing method for a liquid discharge head according to claim 1, wherein the protective layer is a material having a cyclized rubber as a principal component and wherein in the removing step, the protective layer is dissolved and removed using a liquid having xylene as a principal component.

10. A method for producing a liquid discharge head which includes a liquid discharge energy generating element for generating liquid discharge energy, a liquid discharge port for discharging a liquid, a liquid flow path communicating with the liquid discharge port, an electric circuit for driving the liquid discharge energy generating element, a first electrode pad and a second electrode pad, the liquid being discharged from the liquid discharge port by the liquid discharge energy, the method comprising:

preparing a substrate provided with a conductive layer for forming the first electrode pad and the second electrode pad;

forming a protective layer directly on at least the second electrode pad;

after the protective layer is formed, forming a metal layer by a plating method on the conductive layer, thereby completing the first electrode pad;

removing the protective layer after the metal layer is formed; and providing a layer comprised of a resin on the second electrode pad after the protective layer is removed.

* * * * *